United States Patent

Benayoun et al.

(10) Patent No.: US 6,341,346 B1
(45) Date of Patent: Jan. 22, 2002

(54) METHOD FOR COMPARISON BETWEEN A PATTERN SEQUENCE AND A VARIABLE LENGTH KEY

(75) Inventors: Alain Benayoun, Cagnes-sur-mer; Jean-Francois Le Pennec, Nice; Patrick Michel, La Gaude; Claude Pin, Nice, all of (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/245,182

(22) Filed: Feb. 5, 1999

(51) Int. Cl.7 .................................................. G06F 9/305
(52) U.S. Cl. ...................... 712/223; 712/245; 712/248; 712/300; 709/238; 370/392
(58) Field of Search ............................. 712/36, 200, 223, 712/245, 248; 370/392; 709/238

(56) References Cited

U.S. PATENT DOCUMENTS

| | | |
|---|---|---|
| 3,858,240 A | 12/1974 | Golding et al. |
| 3,891,994 A | 6/1975 | Phillips et al. |
| 4,212,028 A | 7/1980 | Drewery |
| 4,290,105 A | 9/1981 | Cichelli et al. |
| 4,315,278 A | 2/1982 | Pasdera |
| 4,459,677 A | 7/1984 | Porter et al. |
| 4,491,861 A | 1/1985 | Sochor |
| 4,500,912 A | 2/1985 | Bolger |
| 4,564,915 A | 1/1986 | Evans et al. |
| 4,580,134 A | 4/1986 | Campbell et al. |
| 4,612,532 A | 9/1986 | Bacon et al. |
| 4,633,490 A | 12/1986 | Goertzel et al. |
| 4,644,389 A | 2/1987 | Nakagawa et al. |
| 4,707,729 A | 11/1987 | Bruno et al. |
| 4,736,287 A | 4/1988 | Druke et al. |
| 4,768,082 A | 8/1988 | Hiratsuka et al. |
| 4,847,677 A | 7/1989 | Music et al. |
| 4,876,541 A | 10/1989 | Storer |
| 4,905,297 A | 2/1990 | Langdon, Jr. et al. |
| 4,956,774 A | 9/1990 | Shibamiya et al. |
| 4,961,139 A | 10/1990 | Hong et al. |
| 5,003,299 A | 3/1991 | Batson et al. |
| 5,020,058 A | 5/1991 | Holden et al. |
| 5,032,987 A | 7/1991 | Broder et al. |
| 5,043,885 A | 8/1991 | Robinson |
| 5,121,494 A | 6/1992 | Dias et al. |
| 5,121,495 A | 6/1992 | Nemes |
| 5,258,983 A | 11/1993 | Lane et al. |
| 5,287,499 A | 2/1994 | Nemes |
| 5,319,682 A | 6/1994 | Clark |
| 5,335,345 A | 8/1994 | Frieder et al. |
| 5,381,145 A | 1/1995 | Allen et al. |
| 5,390,359 A | 2/1995 | Damerau |
| 5,406,281 A | 4/1995 | Klayman |
| 5,424,732 A | 6/1995 | Iyer et al. |
| 5,434,568 A | 7/1995 | Moll |
| 5,442,351 A | 8/1995 | Horspool et al. |
| 5,473,607 A | 12/1995 | Hausman et al. |
| 5,521,940 A | 5/1996 | Lane et al. |
| 5,627,533 A | 5/1997 | Clark |
| 5,701,301 A | 12/1997 | Weisser, Jr. |
| 5,844,508 A | 12/1998 | Murashita et al. |
| 6,115,716 A * | 9/2000 | Tikkanen et al. ............ 707/100 |

FOREIGN PATENT DOCUMENTS

EP    0718980 A1 *  6/1996

* cited by examiner

*Primary Examiner*—William M. Treat
(74) *Attorney, Agent, or Firm*—Cesari and McKenna, LLP

(57) ABSTRACT

A method is disclosed for comparing a pattern sequence with a variable length key. A first bit of this sequence is identified by a pointer, the length and the location of the key are identified by a code word (W, S), the method includes a preliminary step of identifying the sequence and then performing a comparison with the variable length key.

13 Claims, 3 Drawing Sheets

METHOD FOR COMPARISON BETWEEN A PATTERN SEQUENCE AND A VARIABLE LENGTH KEY

BACKGROUND OF THE INVENTION

The present invention relates to a method for comparing a pattern sequence with a key whose length is not predetermined.

In several fields such as transmission media, computing engines and software, data communications and internetworking, it is necessary to move data in a network depending on routing information which is inserted in a pattern preceding these data. Typical equipments involved in this routing operation are switches and routers.

Today's data communication systems would not exist without routers which are used to link remote sites but routing is considered to be one of the major bottlenecks in these systems essentially due to the processing time and the required memory.

Routers should be considered in a very broad sense since, within the past few years, they often happen to be replaced by switches. Anyway, routing functions are still needed even on switched networks, at least at boundaries.

A first main routing function is the determination of a routing path across the network using specific protocols. The path determination is based on a variety of metrics such as the delay introduced by the network or the link cost. In addition, this determination takes into account other rules generically called filtering, such as communication restrictions or priority criteria.

A second routing function is frame forwarding, that is to say the processing of inbound data and the subsequent forwarding of these data to the appropriate outbound destination.

In the case of routers, both functions, the determination of the routing path and the frame forwarding, are performed within the same device. Nevertheless, new techniques tend to exploit the differences between these functions, separating the corresponding operations. For instance, a single routing path calculator could support several frame forwarding units.

Now, it appears that routers show some limitations.

As seen before, the processing time is relatively high and is strongly variable from one routing calculation to another one. It is therefore difficult to support many time sensitive applications such as multimedia.

One critical time consuming operation is the searching function. This operation can be seen as the retrieval of routing information located in the pattern, in particular the destination of the data corresponding to this pattern. The searching involves essentially comparisons between a part of this pattern, or sequence, and predetermined bit series, or keys, which identify appropriate routing information. For this reason, efforts have been made to optimize the speed of comparison by using parallel processing but this method has its own limitations.

Another way to speed up the searching function is to proceed with partial comparisons between a sequence and a key instead of looking for a full match.

It is therefore state of the art to search for the longest prefix shared by this sequence and this key.

As an example, such a method is disclosed in the article "Routing on longest-matching prefixes", IEEE/ACM Transactions on Networking, vol. 4, no. 1, February 1996, pages 86–97.

According to this method, a tree is built up which represents the searching process. This tree is made up of nodes linked together according to an arborescent structure of a binary type. Each node, apart from the root which is the top of the tree, is linked to a parent node. In addition, each node is linked with at most two children. A node represents an elementary step (a partial comparison) in the searching process.

At first, this solution needs a lot of memory for storing the required information in each node. As a consequence, this is not really favorable for the optimization of the processing time.

In other respects, the tree is an evolutional structure and it is necessary to be able to both delete and insert nodes. It appears that in the above solution it is not possible to modify the tree while a search is made.

So, it becomes difficult to manage the tree evolution and searching operations.

SUMMARY OF THE INVENTION

It is therefore a general object of the present invention to provide for a method for searching for routing information that is simple to implement and which is very fast and needs little memory.

Another object of this invention is to allow data sharing between different units involved in the determination of the routing path or in the result of this determination.

It is still a further object of this invention to make the operations associated with searching easier.

In accordance with the present invention, there is provided a method for comparing a pattern sequence with a variable length key; a first bit of the sequence being identified by a pointer, the length and the location of the key being identified by a code word, this method includes a preliminary step for identifying the sequence and then performing a comparison step.

Proceeding in such a way allows use of a unique type of step of searching keys of different lengths in the pattern.

According to this method, a further step is identified by a first address when the comparison is true.

In a preferred embodiment, the sequence is shifted by a first shifting value equal to the length of the key prior to this further step.

Thus, the further step is prepared while executing the first selection single step.

An improvement of the addressing is such that the first address includes a zone indication.

In the same way, a further step is identified by a second address when the comparison is false.

According to an advantageous arrangement, a predetermined value of a field of the first or second address identifies a part of this address as an external return address.

As an interesting feature, the second address is a predetermined function of the first address.

This solution allows not specifically providing the second address.

In addition, the method provides for an age word associated with the comparison step, which age word is incremented when this step is performed.

This is a way to check if the comparison step is used or not, which is useful information in order to manage the tree evolution. In fact, when a step is never used, it could be suitable to delete it.

In addition, a parent word associated with the comparison step identifies the address of a step preceding the comparison step.

In a preferred embodiment, the parent word includes a zone indication.

This method can also be used in conjunction with other types of steps; in this case, it is convenient to identify the above comparison step by a mode indication.

The method is advantageously implemented on a finite state machine.

BRIEF DESCRIPTION OF THE DRAWINGS

Embodiments of the present invention are described below by way of example only with reference to the accompanying drawings, in which.

DETAILED DESCRIPTION OF THE PREFERRED EMBODIMENT

Identical elements that are represented in different figures are referenced with a single symbol.

Figure 1:
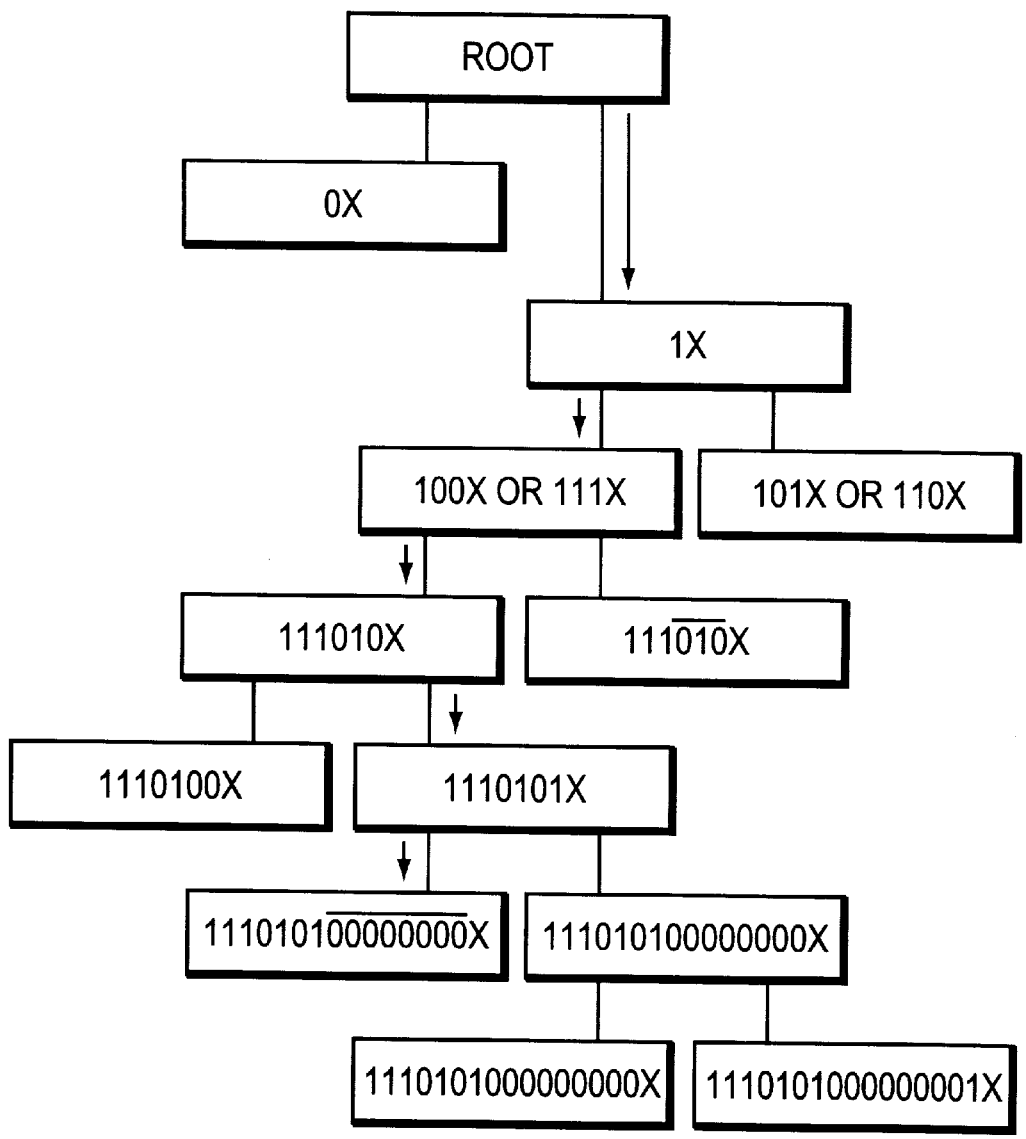
FIG. 1 is a tree according to the present invention.

Referring to FIG. 1, a tree structure according to the present invention is illustrated where ROOT is the top of the tree, where an "X" indicates a bit whose value is irrelevant and where a specific suite of b bits with an upper bar means all the possible values of a b length suite except this specific suite.

Embodiments of this invention are realized by means of 32 bit instructions since it is now an implementation technique very common for one skilled in the art. Nevertheless, the present invention could be realized by any different method.

Figure 2:
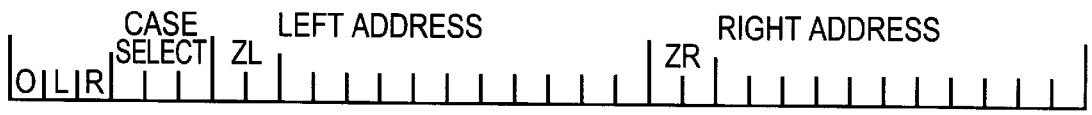
FIG. 2 is a selection instruction according to the present invention.

Referring to FIG. 2, an instruction is proposed for making a selection on a 2 bit pattern sequence.

The first bit is a mode bit that is provided when different instructions are used in the same searching process. In the present case, the mode bit is O.

Next to this mode bit are provided a left shift bit L and a right shift bit R.

Then follows a 3 bit word called CASE SELECT, a first 13 bit word which corresponds to a LEFT ADDRESS, and another 13 bit word which represents a RIGHT ADDRESS.

The CASE SELECT word is used to make a selection on the 2 bit pattern sequence presently analyzed. The selection could take 8 different values which are identified below:

| Case Select | Left    | Right      |
|-------------|---------|------------|
| 000         | 00      | 01, 10, 11 |
| 001         | 01      | 00, 10, 11 |
| 010         | 10      | 00, 01, 11 |
| 011         | 11      | 00, 01, 10 |
| 100         | 00, 01  | 10, 11     |
| 101         | 00, 10  | 01, 11     |
| 110         | 00, 11  | 01, 10     |
| 111         | nothing | all        |

For a predetermined CASE SELECT, when the pattern sequence is in the LEFT column, the present instruction returns to a further instruction whose address is in the LEFT ADDRESS word; otherwise it returns to another instruction whose ADDRESS is in the RIGHT ADDRESS word.

As an example, when CASE SELECT is 101 the sequence corresponding to keys 00 and 10 lead to the LEFT ADDRESS while the sequence corresponding to keys 01 and 11 lead to the RIGHT ADDRESS.

In order to get an explicit wording, the keys that lead to the same address (RIGHT ADDRESS or LEFT ADDRESS) form a routing set.

In a preferred embodiment, the memory for storing the instructions is organized in zones each provided with 11 bit addresses. In this case, LEFT ADDRESS and RIGHT ADDRESS each includes a zone indication ZL and ZR in the two first bits and then a 11 bit relative address.

When the zone indication is 00, the zone involved is the zone preceding the one of the present instruction. When the zone indication is 01 the zone involved is the same as the one of the present instruction. When the zone indication is 10, the zone involved is the zone following the one of the present instruction. Finally, the zone indication is 11 when the search is finished, the present instruction being the last one; the corresponding relative address is an external address.

The left L and right R shift bits are not mandatory for the invention. Nevertheless, they are preferentially used in order to speed up the process by preparing the sequence to be analyzed during the instruction following the present instruction.

When the selection leads to LEFT ADDRESS, the sequence of the pattern is shifted by one bit or two bits corresponding to the left shift bit L being 0 or 1 respectively. Likewise, when the selection leads to RIGHT ADDRESS, the sequence is shifted according to the value of the right shift bit R.

Until now, the sequence was two bits long. It could be interesting to be able to make a one bit comparison, that is to say, to analyze a one bit sequence. In this case, it is convenient to decide that the right bit is considered to determine the CASE SELECT values:

| CASE SELECT | LEFT    | RIGHT |
|-------------|---------|-------|
| 101         | 0       | 1     |
| 111         | nothing | all   |

Obviously, a sequence longer than 2 bits can be analyzed according to the same principle. The main problem is that CASE SELECT length increases very fast with the sequence length. In fact, if the sequence length is b, CASE SELECT length is $(2^b-1)$. Thus for a 3 bit sequence, CASE SELECT is 7 bits long and for a 4 bit sequence CASE SELECT is 15 bits long.

As the instruction is only 32 bits long in the present case, it is possible to conserve bits by omitting the RIGHT ADDRESS, for instance.

The solution is to provide for a predetermined relation between LEFT ADDRESS and RIGHT ADDRESS. The easiest way is to state that the RIGHT ADDRESS equals the LEFT ADDRESS plus one.

Figure 3:
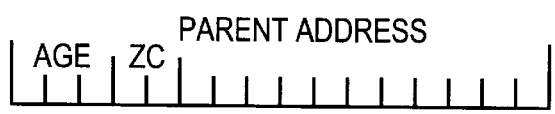
FIG. 3 shows an age word and a parent word according to the present invention.

Referring to FIG. 3, the invention also provides for facilities in order to manage the tree.

An additional AGE field, 3 bits long for instance, is incremented each time the corresponding instruction is executed. Moreover, the AGE fields of all the instructions are periodically reset. Scanning these fields at the same period before the reset allows retrieving those instructions that were not read during this period. This is a way to search for instructions that are never or seldom executed in order to prioritize the deletion of instructions when the memory is full.

Another additional PARENT ADDRESS field, 13 bits long for instance, includes the parent instruction address, that is to say the address of the instruction which was executed just before. This latter address can also include a 2 bit zone indication ZC.

These two additional fields, 16 bits together, can be located behind the corresponding 32 bit instruction. In this case, a single 48 bit word comprising all the fields in relation with an instruction is accessed by the same address.

These two additional fields can also be located at another address which is a predetermined function of the corresponding instruction address. For instance, if the same memory is used, both addresses differ only by an additional most significant bit. If another memory is used, 16 bit words are enough; it is even possible to keep the same binary address.

The invention therefore allows comparing a sequence with a routing set. It also provides for direct comparisons between a sequence and a single key.

Figure 4:
FIG. 4 is a first comparison instruction according to the present invention.

Referring to FIG. 4, a specific instruction is provided.

The first bit (mode bit) is now 1. Next to this bit is a length bit W whose value corresponds to the length of the sequence. In the present case, when this length bit W is 0 or 1, the sequence length is 3 or 4 bits respectively. Next comes the COMP field which contains the key to be compared with the sequence. This field is 4 bits long and the 3 rightmost bits are used when the sequence is only 3 bits long.

Next to the COMP field, the LEFT ADDRESS and RIGHT ADDRESS fields are identical to what was described above. When the sequence matches the key stored in COMP, the RIGHT ADDRESS is selected and, eventually, the sequence is shifted a number of bits equal to the key length. Otherwise, the LEFT ADDRESS is selected and no shift is applied. Naturally, an AGE word can also be used with this instruction.

It is also possible to provide for comparisons with longer keys.

Figure 5:
FIG. 5 is a second comparison instruction according to the present invention.

With reference to FIG. 5, the instruction depicted incorporates a specific header different from any of the other instructions.

The two first bits are 01 followed by a size bit S, which is followed by 3 bits set to 1. One notices that this last combination corresponds to CASE SELECT 111 in the selection instruction mentioned above. In order to eliminate any ambiguity, the left shift bit L is set to 0 when CASE SELECT is 111 in any selection instruction. In this case, the size bit S is 0 or 1 when the sequence length is 8 or 12 bits long respectively.

Next to the first six bits comes the LEFT ADDRESS field which always has the same function. Then comes an unused bit and finally a 12 bit long field COMPAR which contains the key to be compared. When the key length is 8 bits, the last 8 bits of this field are used.

Referring again to FIG. 1, a specific pattern whose value is 1110 1011 0000 0001 01 is now analyzed according to the invention by means of the instructions described above.

Instructions are identified by their addresses in hexadecimal notation. They are as follows:

| address | instruction | | |
|---|---|---|---|
| 001 | 000101 | 11xxxxxxxxxx | 0100000000010 |
| 002 | 011110 | 0100000000011 | 11xxxxxxxxxx |
| 003 | 10x010 | 0100000000100 | 1100000000101 |
| 004 | 000101 | 0100000000110 | 1000000000100 |
| 005 | ... | | |
| 006 | ... | | |
| ... | ... | | |
| 804 | 010111 | 0100000000101 | xxxxx00000000 |
| 805 | 000101 | 11xxxxxxxxxx | 11xxxxxxxxxx |
| 806 | 000111 | xxxxxxxxxxxx | 1100010001000 |

At first, a pointer identifies the first bit of the pattern; the sequence is one bit long. A selection is made on this bit by instruction 001, which leads to instruction 002 (RIGHT ADDRESS). At the same time, the pointer is shifted two bits (R=1).

The next instruction 002 leads to instruction 003 (LEFT ADDRESS) since the sequence (now second and third bits of the pattern) is 11. The pointer is now shifted by 2 bits (L=1), which means that the sequence begins now at the fourth bit of the pattern.

The next instruction 003 is a comparison with the key 010, which leads to instruction 004 (LEFT ADDRESS). The pointer is now shifted by 3 bits, which means that the sequence now begins at the seventh bit of the pattern.

The next instruction 004 is a one bit comparison which leads to instruction 804(RIGHT ADDRESS). The pointer is now on the eighth bit. ADDRESS equals RIGHT ADDRESS plus one).

In instruction 806, the zone indication (11) of the RIGHT ADDRESS means that the search is finished. The longest prefix is 1110101 or 1000101 and the external return address is 000 1000 1000.

Instruction 805 which is not executed in the present case is a one bit comparison.

In a preferred embodiment, the instructions in accordance with the invention are executed in a finite state machine. The processing time is improved because several operations can be executed in parallel. Specifically, when a selection instruction is performed, all the keys of the routing set can be analyzed at the same time. Likewise, the AGE field can also be incremented at the same time.

The implementation of the method on such a machine is within the capacity of one skilled in the art and will therefore not be described with any more detail.

Figure 6:
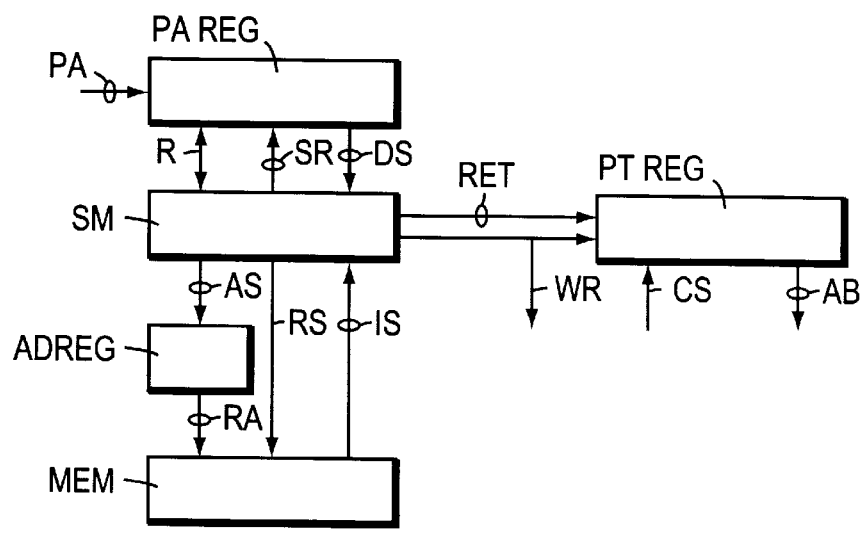
FIG. 6 represents a hardware implementation of the present invention.

Referring to FIG. 6, a circuit is represented which enables implementation of the invention. The main components are the state machine SM, a pattern register PAREG for storing the pattern, a pointer register PTREG for storing an external address, an address register ADREG which contains the current address and a memory MEM.

The pattern register PAREG contains up to 128 bits. It is initialized by a reset signal R which loads the pattern to analyze through bus PA and starts the state machine SM; the sequence is shifted 1, 2, 3, 4, 8 or 12 bits by means of one among 6 shift signals SP. All of these signals come from the state machine SM. The pattern register produces the sequence on a 12 bit data signal DS for the state machine.

The address register ADREG is written by means of an address signal AS produced by the state machine. According to the case, it contains the LEFT ADDRESS or RIGHT ADDRESS of the current instruction. Depending on the zone indication value, the address register produces for the memory MEM the real address RA on 16 bits from the relative address and the zone indication.

A read signal RS coming from the state machine SM allows loading in this state machine the 32 bit instruction IS stored at the address identified by the real address RA.

When the relevant zone indication ZL or ZR is 11, the state machine SM loads the corresponding external address from the LEFT ADDRESS or RIGHT ADDRESS in the pointer register PTREG by means of an 11 bit return signal RET and its write signal WR which may be used to inform an external device that the search is completed. This external address can be accessed on an address bus AB in response to a control signal CS by an external equipment not represented in the figure.

Naturally, the external address associated with the end of the search could be identified by any means different from a predetermined value of the zone indication.

Now, a mechanism is presented which allows the modification of the tree. This mechanism is independent of the search mechanism. It is therefore suitable to provide for a dual access to the memory. Moreover, in order to reduce the access time when tree modifications are frequent, it is suggested to use 2 memories. When a search is running on one memory, the update of the tree is performed on the other memory. In a preferred embodiment, the search mechanism has priority over the update mechanism.

Figure 7:
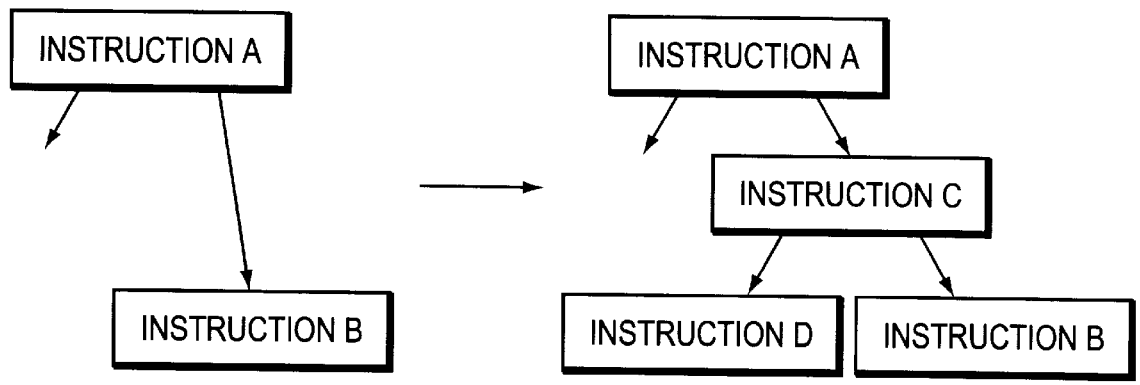
FIG. 7 is an instruction insertion according to the present invention.

Referring to FIG. 7, as an example, a new instruction C is inserted between instructions A and B. At first, INSTRUCTION C is written in memory, with the INSTRUCTION B address as the RIGHT ADDRESS and the INSTRUCTION D address or an external address as LEFT ADDRESS.

INSTRUCTION A is updated replacing the INSTRUCTION B address by the INSTRUCTION C address in the relevant field (RIGHT ADDRESS). It should be noted that other fields may have to be changed such as shifting values or even the type of instruction (selection, 3 or 4 bit comparisons, 8 or 12 bit comparisons).

Figure 8:
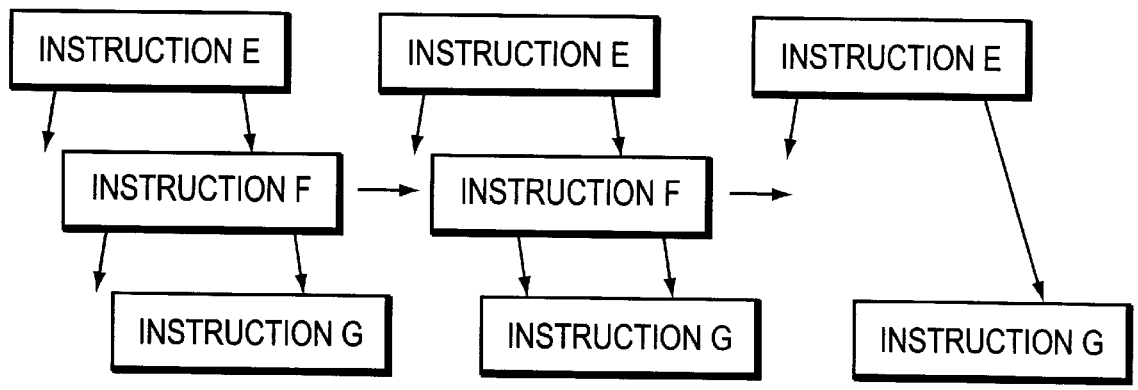
FIG. 8 is an instruction deletion according to the present invention.

Referring now to FIG. 8, an instruction F between instructions E and G is deleted. When the RIGHT ADDRESS ofINSTRUCTIONF is the INSTRUCTION Gaddress, INSTRUCTION F can be deleted only if the LEFT ADDRESS is equal to the RIGHT ADDRESS or if it is an external address. In the latter case, the LEFT ADDRESS of INSTRUCTION F is loaded with the INSTRUCTION B address at first. Then, INSTRUCTION E is updated replacing the INSTRUCTION F address by the INSTRUCTION G address in the relevant field (RIGHT ADDRESS). Finally, INSTRUCTION F can be deleted. Naturally, it is assumed that the deletion of INSTRUCTION F is compatible with the search mechanism.

The scope of the present invention is in no way limited to the above embodiments. In particular, any means could be replaced by equivalent means.

What is claimed is:

1. A method for comparing a pattern sequence with a variable length key wherein, a first bit of said pattern sequence is identified by a pointer, the length and a location of said key are identified by a code word (W, S), comprising the steps of identifying said sequence and comparing said pattern sequence with said variable length key to determine if they match.

2. The method according to claim 1, wherein a further step is identified by a first address (LEFT ADDRESS) when said comparison is true indicating a match.

3. The method according to claim 2, wherein said pattern sequence is shifted by a first shifting value (W, S) equal to the length of said variable length key prior to said further step.

4. The method according to claim 2, wherein said first address (LEFT ADDRESS) includes a zone indication (ZL).

5. The method according to claim 1, wherein a further step is identified by a second address (RIGHT ADDRESS) when said comparison is false indicating no match.

6. The method according to claim 5, wherein said second address (RIGHT ADDRESS) includes a zone indication (ZR).

7. The method according to claim 2 wherein a predetermined value of a field (ZL) of said first address (LEFT ADDRESS) identifies a part of said first address as an external return address.

8. The method according to claim 5 wherein a predetermined value of a field (ZR) of said second address (RIGHT ADDRESS) identifies a part of said second address as an external return address.

9. The method according to claim 8, wherein said second address (RIGHT ADDRESS) is a predetermined function of a first address (LEFT ADDRESS).

10. The method according to anyone of claims 1–9, wherein an age word (AGE) associated with said comparison step is incremented when said comparison step is performed.

11. The method according to anyone of claims 1–9, wherein a parent word (PARENT ADDRESS) associated with said comparison step identifies the address of a step preceding said comparison step.

12. The method according to claim 11, wherein said parent word includes a zone indication (ZC).

13. The method according to anyone of claims 1–9 wherein, when said comparison step is used in conjunction with other steps, it is identified by a mode indication.

* * * * *